(12) United States Patent
Lee et al.

(10) Patent No.: US 7,974,464 B2
(45) Date of Patent: Jul. 5, 2011

(54) METHOD OF DIRECTED PATTERN ENHANCEMENT FOR FLEXIBLE RECOGNITION

(75) Inventors: Shih-Jong J. Lee, Bellevue, WA (US); Seho Oh, Bellevue, WA (US)

(73) Assignee: DRVision Technologies LLC, Bellevue, WA (US)

( * ) Notice: Subject to any disclaimer, the term of this patent is extended or adjusted under 35 U.S.C. 154(b) by 0 days.

(21) Appl. No.: 12/587,157

(22) Filed: Oct. 2, 2009

(65) Prior Publication Data
US 2010/0092075 A1    Apr. 15, 2010

Related U.S. Application Data

(62) Division of application No. 11/301,292, filed on Dec. 7, 2005.

(51) Int. Cl.
*G06K 9/62* (2006.01)
*G06K 9/00* (2006.01)
*G06K 9/40* (2006.01)

(52) U.S. Cl. ......... 382/155; 382/159; 382/181; 382/254

(58) Field of Classification Search .......... 382/155–160, 382/254, 199, 181
See application file for complete search history.

(56) References Cited

U.S. PATENT DOCUMENTS

| | | | | |
|---|---|---|---|---|
| 4,833,722 A * | 5/1989 | Morton et al. | ................. | 382/199 |
| 4,914,708 A * | 4/1990 | Carpenter et al. | ............ | 382/156 |
| 5,031,226 A * | 7/1991 | Delange | ......................... | 382/199 |
| 5,052,043 A * | 9/1991 | Gaborski | ....................... | 382/157 |
| 5,103,488 A * | 4/1992 | Gemello et al. | ............. | 382/199 |
| 5,687,251 A * | 11/1997 | Erler et al. | ..................... | 382/133 |
| 5,706,364 A * | 1/1998 | Kopec et al. | ................... | 382/159 |
| 5,724,455 A * | 3/1998 | Eschbach | ...................... | 382/260 |
| 5,754,676 A * | 5/1998 | Komiya et al. | ............... | 382/132 |
| 6,381,372 B1 * | 4/2002 | Loce | ............................. | 382/261 |
| 6,507,675 B1 * | 1/2003 | Lee et al. | ...................... | 382/266 |
| 6,678,404 B1 * | 1/2004 | Lee et al. | ...................... | 382/155 |
| 7,007,235 B1 * | 2/2006 | Hussein et al. | ............... | 715/751 |
| 7,072,523 B2 * | 7/2006 | Bolle et al. | .................... | 382/254 |
| 7,133,560 B2 * | 11/2006 | Lee | ................. | 382/226 |
| 7,295,687 B2 * | 11/2007 | Kee et al. | ...................... | 382/118 |
| 7,308,134 B2 * | 12/2007 | Wersing et al. | ............... | 382/161 |
| 7,379,568 B2 * | 5/2008 | Movellan et al. | ............. | 382/118 |
| 7,613,363 B2 * | 11/2009 | Platt et al. | ..................... | 382/299 |
| 7,702,172 B2 * | 4/2010 | Chapoulaud | ................. | 382/256 |
| 7,715,643 B2 * | 5/2010 | Kondo et al. | .................. | 382/254 |
| 7,730,406 B2 * | 6/2010 | Chen | .............................. | 715/723 |
| 7,734,089 B2 * | 6/2010 | Zhang et al. | .................. | 382/181 |
| 7,738,725 B2 * | 6/2010 | Raskar et al. | ................. | 382/266 |
| 2002/0044014 A1 * | 4/2002 | Wright et al. | ..................... | 330/2 |
| 2002/0164070 A1 * | 11/2002 | Kuhner et al. | ............... | 382/159 |
| 2005/0047646 A1 * | 3/2005 | Jojic et al. | ..................... | 382/159 |
| 2005/0100208 A1 * | 5/2005 | Suzuki et al. | ................. | 382/157 |

(Continued)

*Primary Examiner* — Bhavesh Mehta
*Assistant Examiner* — Michelle Entezari

(57) ABSTRACT

A directed pattern enhancement method receives a learning image and pattern enhancement directive. Pattern enhancement learning is performed using the learning image and the pattern enhancement directive to generate pattern enhancement recipe. An application image is received and a pattern enhancement application is performed using the application image and the pattern enhancement recipe to generate pattern enhanced image. A recognition thresholding is performed using the pattern enhanced image to generate recognition result. The pattern enhancement directive consists of background directive, patterns to enhance directive, and patterns to suppress directive. An update learning method performs pattern enhancement progressive update learning.

3 Claims, 12 Drawing Sheets

U.S. PATENT DOCUMENTS

| | | | |
|---|---|---|---|
| 2006/0067573 A1* | 3/2006 | Parr et al. | 382/154 |
| 2006/0182361 A1* | 8/2006 | Ptucha et al. | 382/254 |
| 2006/0257017 A1* | 11/2006 | Luo | 382/159 |
| 2006/0262959 A1* | 11/2006 | Tuzel et al. | 382/103 |
| 2007/0031037 A1* | 2/2007 | Blake et al. | 382/173 |
| 2007/0230760 A1* | 10/2007 | Omi et al. | 382/131 |

\* cited by examiner

METHOD OF DIRECTED PATTERN ENHANCEMENT FOR FLEXIBLE RECOGNITION

CROSS REFERENCE TO RELATED APPLICATION

This is a divisional of U.S. application Ser. No. 11/301,292, filed Dec. 7, 2005.

TECHNICAL FIELD

This invention relates to the enhancement of patterns in digital images to determine the regions in the images corresponding to those patterns of interest.

BACKGROUND OF THE INVENTION

Significant advancement in imaging sensors, microscopes, digital cameras, and digital imaging devices coupled with high speed network connection and large storage devices enables broad new applications in image based measurement, analyses, and decisions. Patterns of interest on images depending on object properties, imaging conditions and application requirements. Therefore, they could vary significantly among applications. Recognize and extract patterns of interest from images have been a longstanding challenge for a vast majority of the imaging applications. Except for simple applications where patterns could be extracted by simple intensity threshold, manual drawing or extensive custom programming is often required for image pattern extraction. Manual drawing is tedious and irreproducible. Custom programming requires significant image processing and programming knowledge that is neither available nor cost effective for most of practical applications. The lack of adequate solutions to the recognition and extraction of patterns from images represents a critical bottleneck in productive applications of image based measurement and analyses.

It is highly desirable to have a general purpose solution that allows user to flexibly direct the computer to recognize and to extract the wide variety of patterns of interest without any knowledge of image processing and programming. The solution has to be fast in execution and has to be robust that could yield good results over a large number of images. The solution should also allow incremental updates and changes of the recognition instructions by human.

Prior art image pattern extraction or object segmentation methods are performed in a primitive and ad-hoc fashion on almost all image processing systems. For simple applications, image thresholding is the standard method for pattern segmentation. This works on images containing bright objects against dark background or dark objects against bright background. In this case, the pattern segmentation methods amount to determining a suitable threshold value to separate objects from background (Haralick R M and Shapiro, L G, "Survey Image Segmentation Techniques," Comput Vision, Graphics Image Processing, vol. 29: 100-132, 1985; Otsu N, "A Threshold Selection Method for Gray-level Histograms," IEEE Trans. System Man and Cybernetics, vol. SMC-9, No. 1, January 1979, PP 62-66). For images with multiple object types with high object boundary contrast, edge detection methods are often used for object segmentation. (Lee, J S J, Haralick, R M and Shapiro, L G, "Morphologic Edge Detection," IEEE Trans. Robotics and Automation RA3(2):142-56, 1987.) However, the above methods are only applicable to easy cases with high signal contrast and low noise. They fail miserably on more challenging applications where the pattern of interest is not simple and the signal to noise is not high.

Application specific pattern extraction methods were developed for complicated yet well-defined and high volume applications such as blood cell counting, Pap smear screening, and semiconductor inspection. Human with image processing expertise through extensive programming and trial and error process that involves not only object segmentation module but also optics, illumination, and image acquisition process adjustments developed the application specific object segmentation methods. For complicated yet not well-defined or low volume applications, automatic pattern extraction method doe not exist.

OBJECTS AND ADVANTAGES

This invention provides a solution for flexible recognition and extraction of patterns directed by human. It could provide the critical solution to enable productive image based measurement, analyses, and decision on a wide variety of applications. The invention allows user directed specification of patterns of interest and patterns to suppress. It then performs enhancement of the patterns. The pattern enhanced image has higher values for patterns of interest and lower values for patterns to suppress and background. Therefore, the pattern extraction could be accomplished by simple thresholding on the pattern enhanced image similar to the standard solution for simple problems. So this invention essentially turns challenging pattern extraction problem into simple thresholding task.

The invention allows the creation of pattern enhancement recipe that records the pattern learning results. The pattern enhancement recipe could be updated by user direction after reviewing the pattern enhancement and recognition results. Two types of update methods are supported: a progressive update method and a regressive update method. The progressive update method adds new learning data into the recipe. The regressive update method removes existing learning data from the recipe. This allows the incremental training of the pattern enhancement software with a small number of images and then tune the pattern enhancement and recognition performance on a large number of images. This is accomplished by evaluating the performance on new images and by adding patterns with erroneous results or by removing the patterns that were trained into the recipe.

Many different patterns could exist in a single image. The flexible pattern specification capability provided by the invention allows selectively learning of different patterns of interest and encoding into different pattern enhancement recipes for an image. Therefore, different patterns could be freely extracted from an image separately.

To achieve real time performance, a hierarchical modeling method is used that allows efficient model generation and model matching. It also supports fast model update.

The primary objective of the invention is to provide a general purpose image pattern extraction method that can be trained to automatically perform image pattern extraction for almost all image processing applications. The second objective of the invention is to provide an accurate and robust method for image pattern extraction on complicated object types. The third objective of the invention is to provide an easy user directed specification of patterns of interest and patterns to suppress. The fourth objective of the invention is to allow the creation of pattern enhancement recipe that records the pattern learning results. The fifth objective of the invention is to update pattern enhancement recipe by user direction after reviewing the pattern enhancement and recognition results. The sixth objective is to allow different patterns to be freely extracted from an image separately. The seventh objective of the invention is to achieve real-time performance for pattern learning, pattern matching and recipe update.

SUMMARY OF THE INVENTION

A directed pattern enhancement method receives a learning image and pattern enhancement directive. Pattern enhancement learning is performed using the learning image and the pattern enhancement directive to generate pattern enhancement recipe. An application image is received and a pattern enhancement application is performed using the application image and the pattern enhancement recipe to generate pattern enhanced image. A recognition thresholding is performed using the pattern enhanced image to generate recognition result.

The pattern enhancement directive consists of background directive, patterns to enhance directive, and patterns to suppress directive.

A partitioned modeling method receives an image region and performs feature extraction on the image region to generate characterization feature. A hierarchical partitioning is performed using the characterization feature to generate hierarchical partitions. A model generation is performed using the hierarchical partitions to generate partition model. The partitioned modeling further performs a partitioned matching step that matches an input point to the partition model to generate a matching score output.

A partition model update method receives a partition model and input data for model update. A partition model update is performed using the partition model and the data to generate a updated partition model.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Application Scenario

Figure 1:
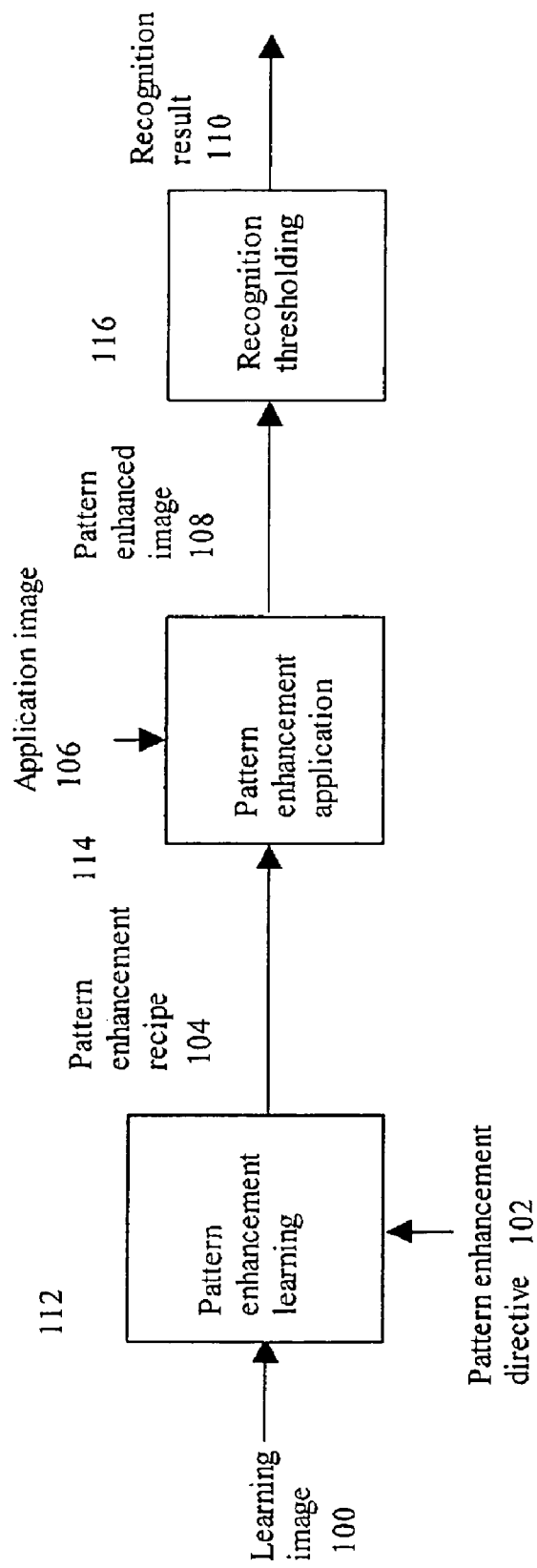
FIG. 1 shows the processing flow for the application scenario of the directed pattern enhancement and recognition method.

The application scenario of the directed pattern enhancement and recognition method is shown in FIG. 1. As shown in the figure, a learning image 100 is processed by a pattern enhancement learning step 112 that also inputs the pattern enhancement directive 102 including at least one region containing the to-be-enhanced pattern example. The pattern enhancement learning step 112 generates pattern enhancement recipe 104 containing the pattern model and/or enhancement procedures. The pattern enhancement recipe is used by a pattern enhancement application step 114 for application image(s) 106. The application image 106 could be the same or different from the learning image 100. The pattern enhancement application 114 generates a pattern enhanced image 108. The pattern enhanced image 108 can be processed by recognition thresholding 116 to generate recognition result 110. The recognition thresholding could be performed by conventional thresholding method such as selecting pixels fall within a range of grayscale intensities.

Figure 2:
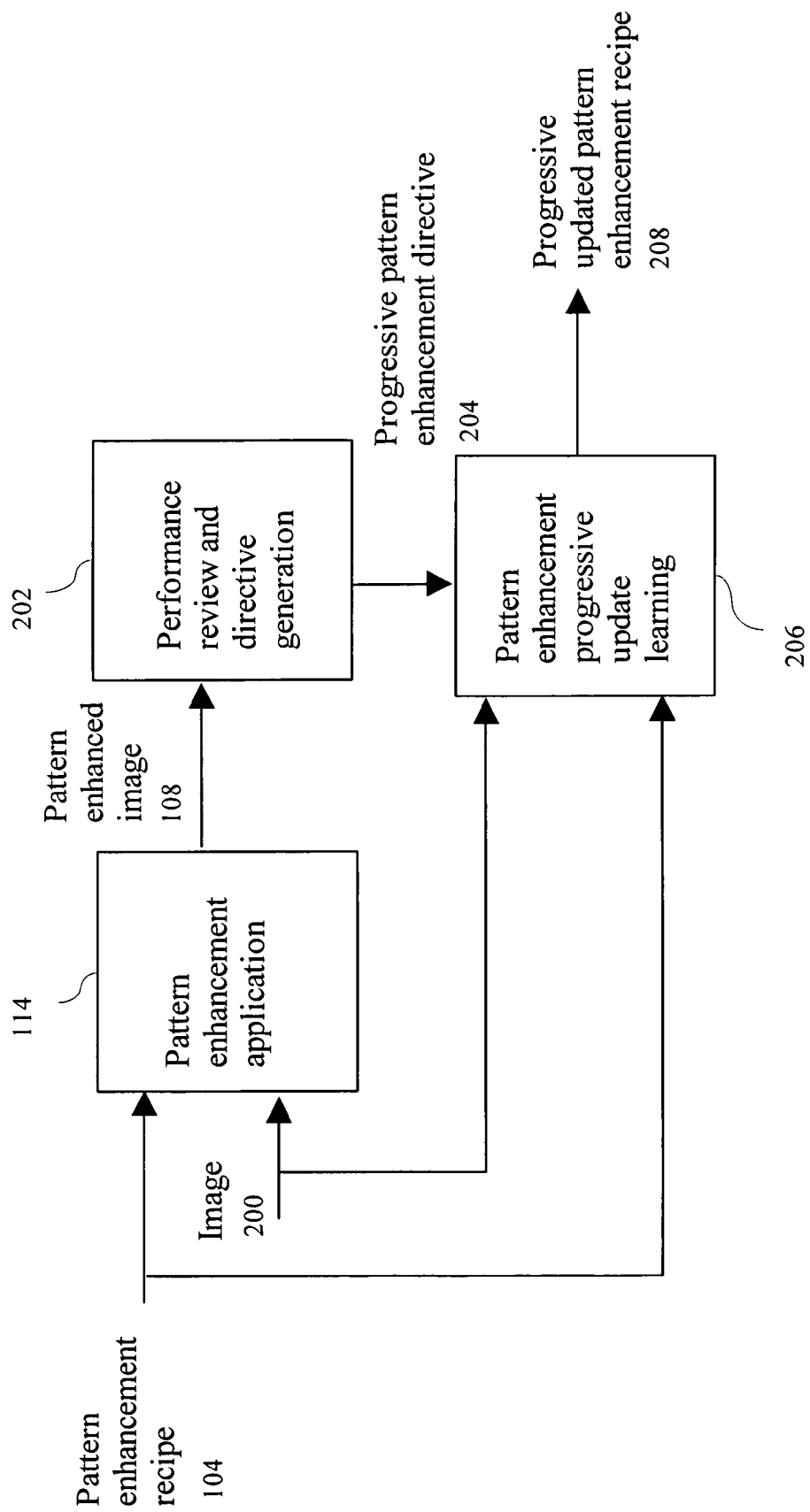
FIG. 2 shows the application scenario of the progressive update learning method.

In practical applications, the limited pattern examples learned from the learning image may not be representative of the volume data encountered during the application phase. This invention includes pattern enhancement update learning to allow the update of the pattern enhancement recipe. This allows the user to "get started" with a manageable amount of learning data and then improve as the broader scope of the application becomes apparent during actual use. There are two types of update learning: progressive update and regressive update. The application scenario of the progressive update learning is shown in FIG. 2. Image 200 and pattern enhancement recipe 104 are used during pattern enhancement application 114 to generate pattern enhanced image 108. The pattern enhanced image 108 are evaluated by a performance review and directive generation step 202. The performance review is typically conducted by a user visually and/or using image examination tool. The performance review and directive generation step 202 identifies the error of the pattern enhanced image 108. To fix the error, some of the error associated regions are specified in the progressive pattern enhancement directive 204. The progressive pattern enhancement directive 204 and the image 200 and pattern enhancement recipe 104 are used by the pattern enhancement progressive update learning step 206 to generate a progressive updated pattern enhancement recipe 208.

Figure 3:
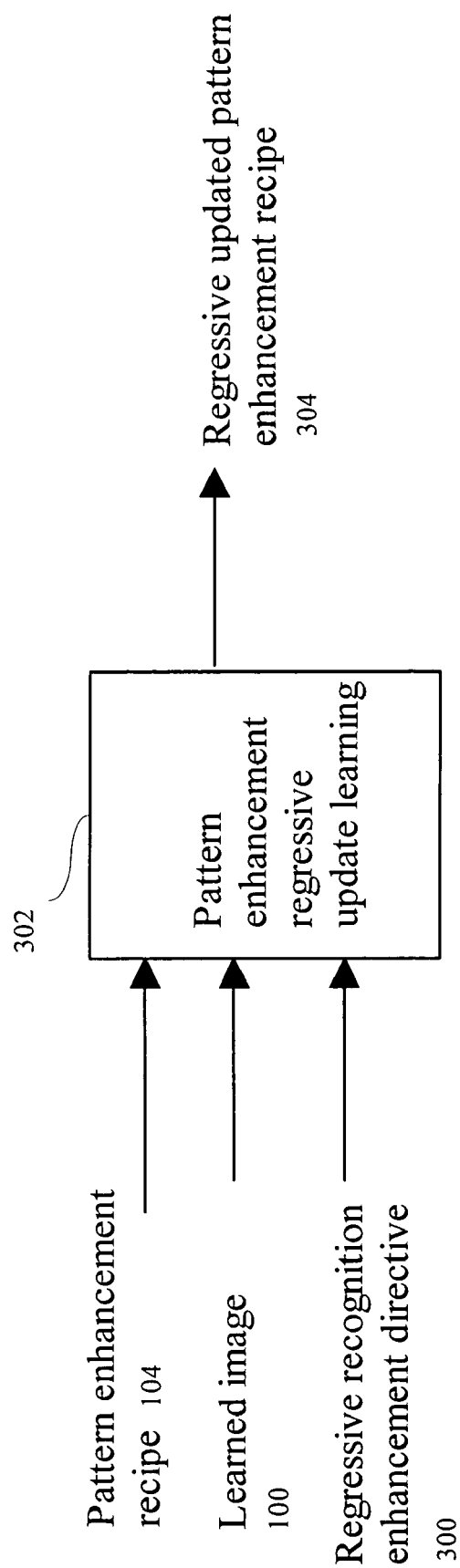
FIG. 3 shows the application scenario of the regressive update learning method.

The application scenario of the regressive update learning is shown in FIG. 3. The regressive update allows the removal of previously learned image 100 from the pattern enhancement recipe 104. This is done by specifying a regressive recognition enhancement directive 300 and processed by the pattern enhancement regressive update learning step 302. This results in a regressive updated pattern enhancement recipe 304.

II. Partitioned Modeling and Matching Method

The partitioned modeling and matching method of this invention is one of the basic processing method applied to many steps of the directed enhancement method. Therefore, it is described first. The partitioned modeling and matching method includes partitioned modeling and partitioned matching as well as partition model update.

II.1 Partitioned Modeling

Figure 4:
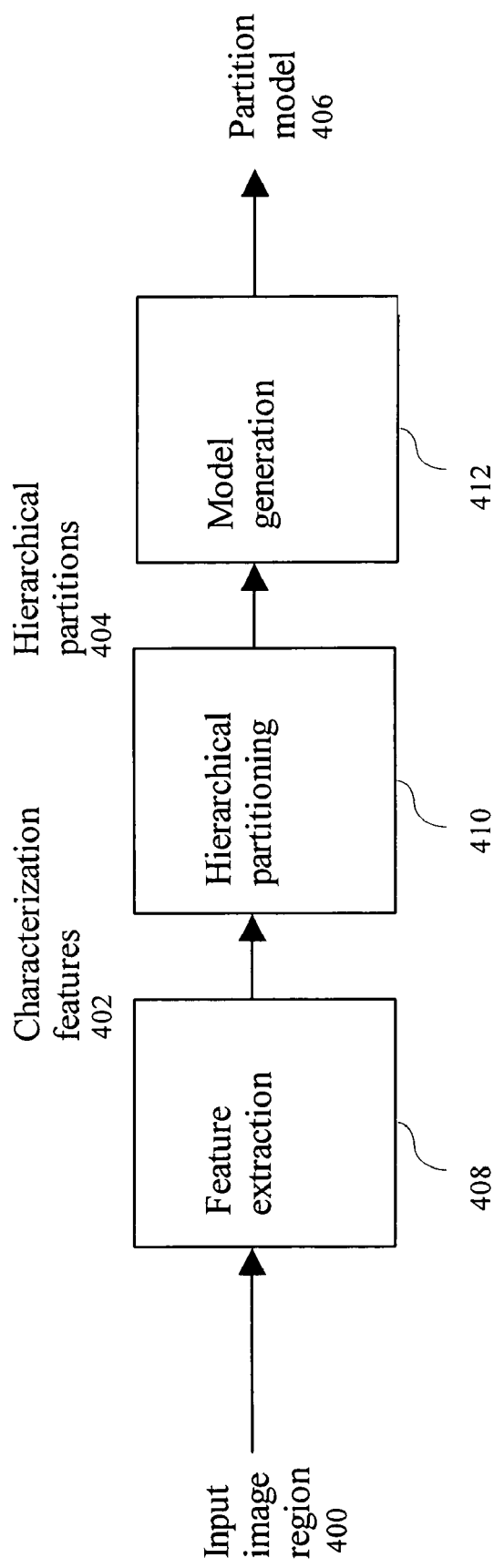
FIG. 4 shows the processing flow for the partitioned modeling method.

The partitioned modeling method extracts characterization features for input points and partitioned the points into a hierarchy of groups. Each group is then modeled by a multi-dimensional Gaussian distribution. The processing flow of the partitioned modeling method is shown in FIG. 4.

The points in the single or a plurality of input image regions 400 are processed to extract characterization features by a feature extraction step 408. The extracted feature vectors are the characterization features 402 that are processed by a hierarchical partitioning step 410 to generate hierarchical partitions 404. The hierarchical partitions 404 are used by a model generation step 412 to generate the partition model 406.

Using image point as the basic unit for modeling provides the most flexibility for pattern specification, learning and update. A possible drawback is the lack of structure and contextual information by point representation. To overcome the drawback, we extract image structure, contextual and intensity distribution features surrounding each point and associate them with the point for modeling. This is accomplished by the feature extraction step. The extracted characterization features are processed by a hierarchical partitioning step to generate hierarchical partitions. The hierarchical partitions are used by a model generation step to generate the partition model. There will be one partition model for each of the background, patterns to enhance, and patterns to suppress. The matching includes point-wise partitioned matching followed by iterative morphological filtering (Lee J S J. 2002. "Structure-guided image processing and image feature enhancement", U.S. Pat. No. 6,463,175, October 8) on the matching scores. The filtering uses neighbor context to remove noise in matching score to further overcome the limitation of point representation.

II.1.1 Feature Extraction

A subset of characterization features associated with each point is extracted. The extracted feature vectors will be used for hierarchical partitioning. In one embodiment of the invention, the features are derived from the grayscale intensity of the learning image. In addition to the original grayscale intensity, a pixel neighborhood (such as 3×3, 5×5, 7×7 etc.) is defined. The grayscale intensity statistics such as mean, standard deviation, skewness, kurtosis and other statistics such as cooccurrence matrix based texture measurements can be derived. Moreover, pre-processing of the grayscale intensity can be performed before gathering the statistics. The pre-processing includes point operations such as logarithm conversion for optical density measurement or filtering such as edge enhancement by linear or morphological gradient operator that includes dark edge, bright edge, and general edge enhancement (Lee, J S J, Haralick, R M and Shapiro, L G, "Morphologic Edge Detection," IEEE Trans. Robotics and Automation RA3(2):142-56, 1987)

When the input image is a color image, color transformation may be applied to convert the color image into multi-bands of grayscale images. In one embodiment of the invention, the multiple bands includes the following images: R (Red channel), G (Green channel), B (Blue channel), (R−G)/(R+G), R/(R+G+B), G/(R+G+B), B/(R+G+B), R/G, R/B, G/B, G/R, B/G, B/R, etc.

The intensity space features with and without pre-processing can be generated for each band of the image. The characterization features could be performed in multi-resolution representation of the input image to characterize the patterns in different scales.

Those ordinary skilled in the art should recognize that other feature spaces such as temporal space or different focal planes could be used and they are all within the scope of this invention.

II.1.2 Hierarchical Partitioning

The hierarchical partitioning method determines the intrinsic grouping of the input data and organizes them in a hierarchical structure. In one embodiment of the invention, the hierarchical clustering method is used (Sergios Theodoridis, Konstantinos Koutroumba Pattern Recognition, P. 403-431, Academic Press, 1999). The hierarchical clustering method performs a series of partitions steps, which may run from a single cluster containing all points to n clusters each containing a single point.

Figure 5:
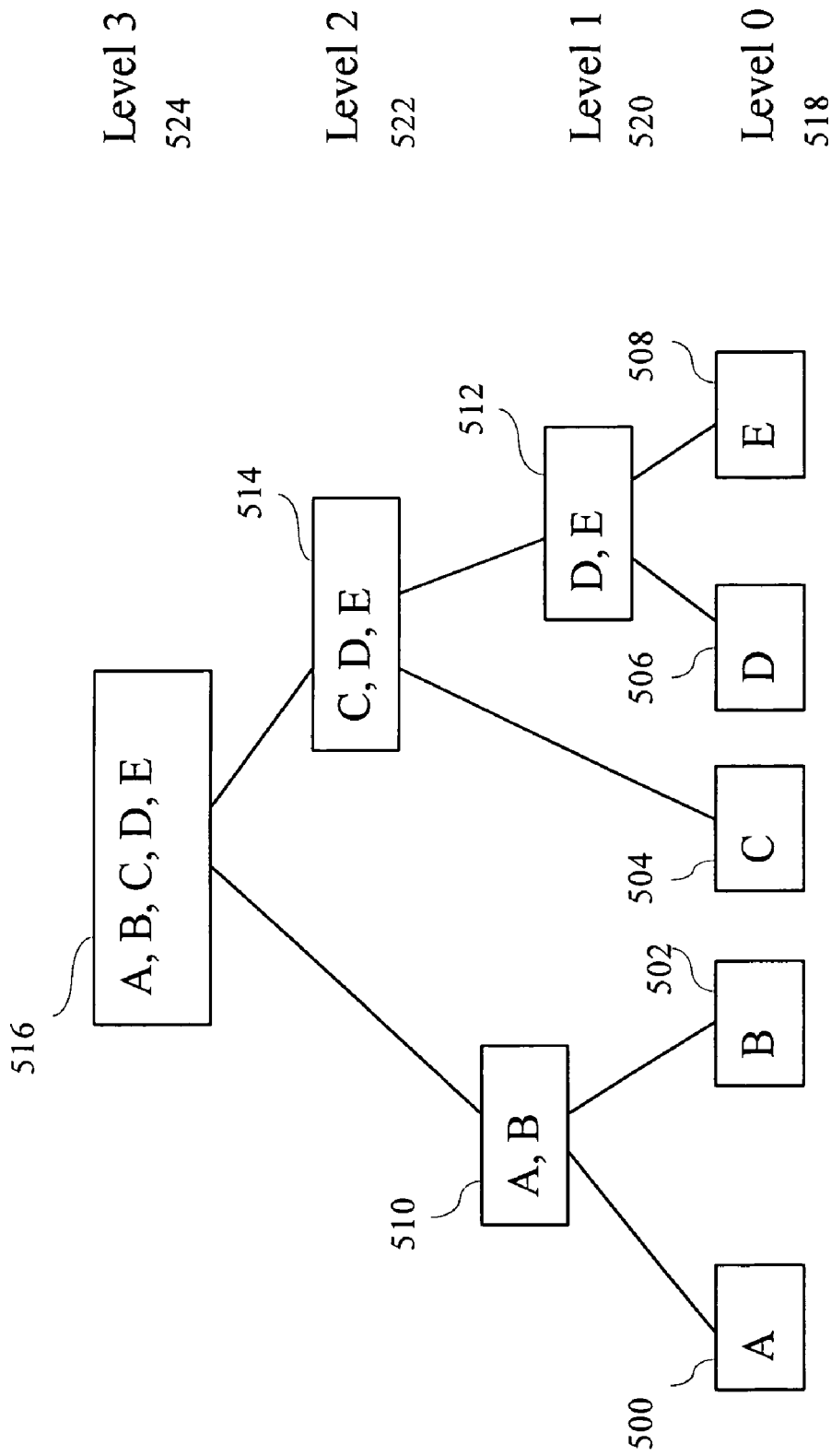
FIG. 5 shows an example dendrogram containing 4 levels and 5 points A, B, C, D, E.

Hierarchical Clustering is subdivided into agglomerative methods, which proceed by series of fusions of the n points into groups, and divisive methods, which separate n points successively into finer groupings. In this preferred embodiment of the invention, the agglomerative method is used. Hierarchical clustering may be represented by a two dimensional diagram known as dendrogram which illustrates the fusions or divisions made at each successive stage of analysis. An example of such a dendrogram is shown in FIG. 5. As shown in FIG. 5, the lowest level, level 0 518, of the dendrogram consists of 5 partitions (clusters), A 500, B 502, C 504, D 506, and E 508. The next level, level 1, consists of 2 partitions (A,B 510 and D, E 512) wherein partition A, B 510 is the result of the merger of partitions A 500 and B 510. The partition D, E 512 is the result of the merger of partitions D 506 and E 508. Level 2 522 have only one partition, C, D. E 514 that is the merging result of partition D,E 512 and partition C 504. Finally, the highest level, Level 3 524, consists of all data A, B, C, D, E 516.

The agglomerative hierarchical clustering procedure produces a series of partitions of the data. The lowest level (Level 0 518), consists of single point 'clusters', the highest level (Level 3 524), consists of a single group containing all points.

At each particular stage the method joins together the two clusters which are closest (most similar) together.

Different ways of defining distance (or similarity) metric between clusters r and s can be used such as single linkage where the distance between two clusters is given by the value of the shortest link between the clusters:

D(r,s)=Min {d(i,j): Where point i is in cluster r and point j is cluster s}

The complete linkage, also called farthest neighbor, method is the opposite of single linkage. Distance between groups is defined as the distance between the most distant pair of points, one from each group:

D(r,s)=Max {d(i,j): Where point i is in cluster r and point j is cluster s}

In the average linkage method the distance between two clusters is defined as the average of distances between all pairs of points, where each pair is made up of one point from each cluster:

$$D(r,s) = Trs/(Nr*Ns)$$

Where Trs is the sum of all pairwise distances between cluster r and cluster s. Nr and Ns are the sizes of the clusters r and s, respectively.

In the average group linkage method, groups once formed are represented by their mean values for each feature, that is, their mean vector, and inter-group distance is now defined in terms of distance between two such mean vectors.

At each stage of hierarchical clustering, the clusters r and s, for which D(r,s) is minimum, are merged. In this case, those two clusters are merged such that the newly formed cluster, on average, will have minimum pairwise distances between the points in it.

Hierarchical clustering method could be computationally demanding when there are many points in the input set. In one embodiment of the invention, a fast hierarchical clustering method is used. This method generates multiple points pre-clusters using non-hierarchical clustering methods such as k-means clustering, fuzzy c-means clustering, QT clustering, locality-sensitive hashing, graph-theoretic methods and their derivatives. The pre-clusters are used at the bottom of the hierarchy. We then join together pre-clusters in a hierarchical fashion. Since the number of clusters could be dramatically reduced using this pre-clustering method. The pre-clusters can be generated using K-means clustering methods by choosing a suitable number of initial clusters (K) based on the number of data points and the available computational resource.

The computational requirement for distance calculation depends on the number of features used. In addition, irrelevant features could degrade the effectiveness of the clustering. It is desirable to perform feature selection to find discriminate features for the hierarchical partitioning. Also, the features used for distance metric could be different at different levels of the hierarchy. This allows the efficient use of features without requiring expensive computational resource.

II.1.3 Model Generation

After the hierarchical partitioning step, each of the partitions (clusters) within the hierarchical structure consists of its data and its associated feature vectors. The model generation step estimates the model parameters for the partitions from the lowest level to the highest level. The generated models are used for partitioned matching and partition model update.

In one embodiment of the invention, the multidimensional Gaussian distribution is used as the model. Given the feature space and a partition of N points, a Gaussian distribution can be fully modeled by its mean vector $\underline{m}[N]$ and covariance matrix $\underline{C}[N]$ as follows:

$$\underline{m}[N] = \frac{1}{N}\sum_{i=1}^{N} x_i$$

$$\underline{C}[N] = \frac{1}{N}\sum_{i=1}^{N} x_i x_i^T - \underline{m}[N]\underline{m}^T[N]$$

Figure 6:
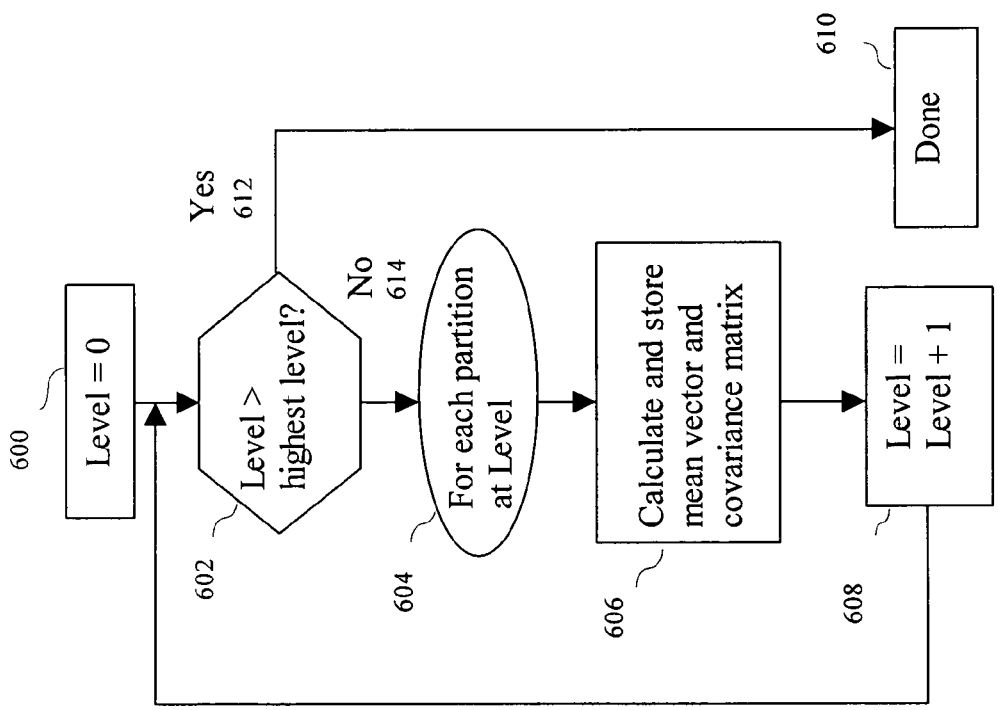
FIG. 6 shows the processing flow chart for the model generation method.

The processing flow chart for the model generation method is shown in FIG. 6.

As shown in FIG. 6, the model generation is performed from the lowest levels (Level=0, 600) up to the highest level. For each partition at a given level 604, the mean vector and covariance matrix of each of the partitions are separately calculated and stored 606. The mean vector and covariance matrix could be calculated using based on their definitions or calculated incrementally. That is, the mean vector $\underline{m}[N]$ and covariance matrix $\underline{C}[N]$ for up to the N points could be derived from mean vector $\underline{m}[N-1]$ and covariance matrix $\underline{C}[N-1]$ for up to the N-1 points and the feature vector $\underline{X}_N$ of the new point of index N. The incremental update rules are as follows:

A. Mean Vector Incremental Update Rule

Since $$\underline{m}[N] = \frac{1}{N}\sum_{i=1}^{N} x_i$$

$$= \frac{1}{N}\left[\sum_{i=1}^{N-1} x_i + x_N\right]$$

$$= \frac{1}{N}\{(N-1)\underline{m}[N-1] + x_N\}$$

$$= \frac{1}{N}\{(N\underline{m}[N-1] - \underline{m}[N-1] + x_N\}$$

Therefore, the update rule is $$\underline{m}[N] = \underline{m}[N-1] + \frac{1}{N}\{x_N - \underline{m}[N-1]\}$$

B. Covariance Matrix Incremental Update Rule $$\underline{C}[N] = \underline{D}[N-1] + \frac{1}{N}\{x_N x_N^T - \underline{D}[N-1]\} - \underline{m}[N]\underline{m}^T[N]$$

Where $$\underline{D}[N] = \frac{1}{N}\sum_{i=1}^{N} x_i x_i^T$$

Therefore, in addition to N and $\underline{C}[N]$, $\underline{D}[N]$ should be stored for convenient update. Alternatively, $\underline{D}[N]$ can be derived from $\underline{C}[N]$ as $$\underline{D}[N] = \underline{C}[N] + \underline{m}[N]\underline{m}^T[N]$$

In the hierarchical partitions, a higher level partition is made up of its corresponding child level partitions. For the same feature space, the mean vector and the covariance matrix of the parent level could be calculated directly from those of the child levels without accessing each individual points. Assuming the two children partitions have M and N points. Then the mean vector and covariance matrix of the parent partition can be calculated by the following combination rule:

C. Mean Vector Combination Rule

Since $$\underline{m}[M+N] = \frac{1}{M+N}\sum_{i=1}^{M+N} x_i$$

$$= \frac{1}{M+N}\left[\sum_{i=1}^{M} x_i + \sum_{i=M+1}^{N} x_i\right]$$

$$= \frac{1}{M+N}\{M\underline{m}[M] + N\underline{m}[N]\}$$

Therefore, the combination rule is $$\underline{m}[M+N] = \frac{M}{M+N}\underline{m}[M] + \frac{N}{M+N}\underline{m}[N]$$

D. Covariance Matrix Combination Rule $$\underline{C}[M+N] = \frac{M}{M+N}\underline{D}[M] + \frac{N}{M+N}\underline{D}[N] - \underline{m}[M+N]\underline{m}^T[M+N]$$

After completing the mean vector and covariance matrix for each partition at a level, the 395 level is incremented by 1 (608) and a check of the level versus the highest level is performed (602). If the level exceeds the highest level (612), the model generation is completed. Otherwise (614), the process continues to the next level.

II.2 Partitioned Matching

Figure 7:
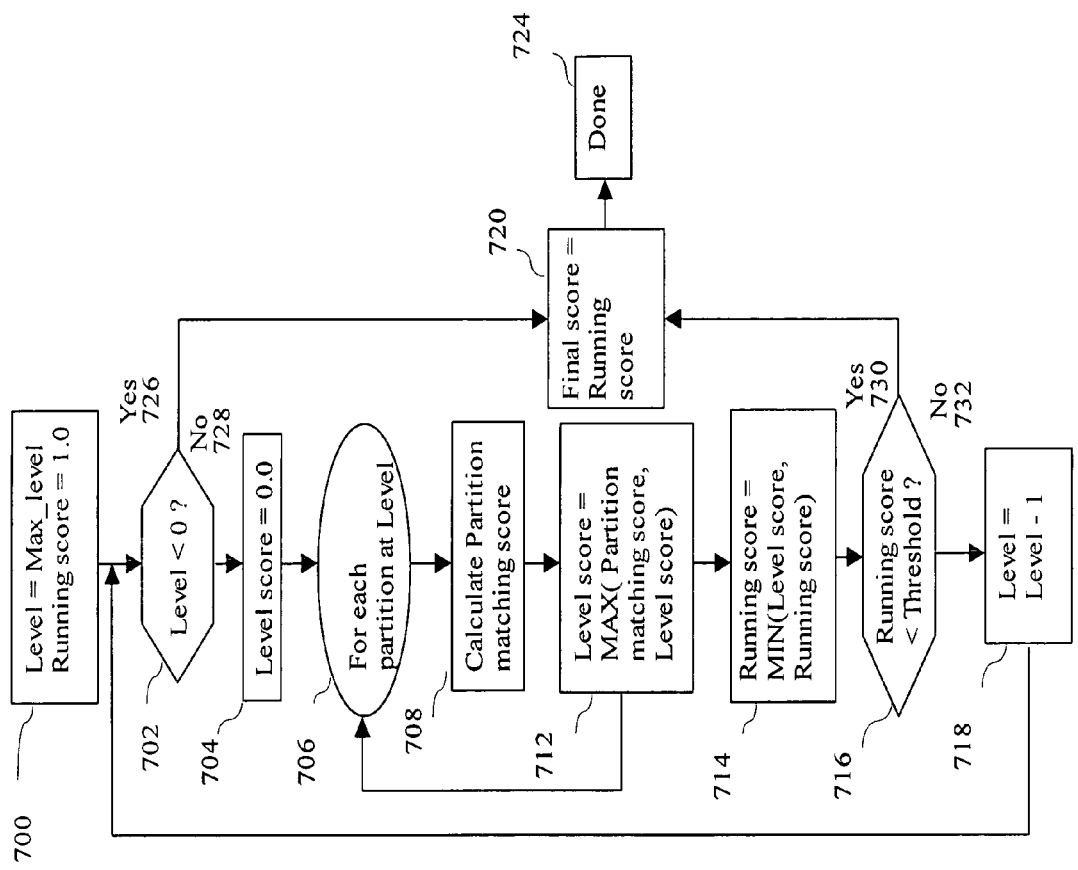
FIG. 7 shows the processing flow for the partitioned matching method.

The partitioned matching method matches an input point to a partition model and generates a matching score indicating the likelihood of the point belongs to the set represented by the partition model. The portioned matching is performed from highest level down to the lowest level in a focus of attention fashion. At each level a matching score is created. A running matching score integrates the matching score from the highest level up to the current level. To speed up the matching process if the running matching score is below a minimum threshold, the matching process can be stopped and the running score is used as the final score. The processing flow for the partitioned matching method is shown in FIG. 7. The partitioned matching could be followed by a filtering step using linear nonlinear or iterative morphological filtering (Lee J S J. 2002. "Structure-guided image processing and image feature enhancement", U.S. Pat. No. 6,463,175, October 8) on the matching scores. The filtering uses neighbor context to remove noise on matching score to further overcome the limitation of point representation As shown in the flow chart, the partitioned matching starts at the highest level and the running score is initialized to 1.0 (best match) 700. At a given partition level, the level matching score is initialized to 0.0 (worst match) 704. For each partition at the same level 706, partition matching score is calculated 708. The level score is updated with the 420 maximum partition matching score at the same level 712. After the completion of a level, the running score is updated to be the minimum value of the current running score and the level score 714. After update, the running score is checked against a threshold 716, if the running score falls below the threshold 730, the point is considered not a good match and there is no need to continue. In this case, the final match score is set to the running score 720 and the match processing stops 724.

If the running score is above the threshold 732, the match process continues to the next partition level 718, 702, 728 unless the 0-th level is reached 726 after level checking 702. The use of Minimum function among different levels for running score calculation requires that a good match point matches well at all levels. The use of Maximum function among all partitions within a level allows a point to be considered good match to the level as long as at least one of the partitions yields good score. This is because the pattern set is represented by the union of multiple partitions.

The partition matching score can be calculated using the multidimensional Gaussian model. In one embodiment of the invention, the matching score is calculated as one minus the cumulative probability of the Gaussian function for the partition. In the following, we describe the calculation method for the cumulative probability of the Gaussian function.

For a point whose feature vector is $\underline{x}$ and a partition who mean vector and covariance matrix are $\underline{m}$ and $\underline{\underline{C}}$, the distance between $\underline{x}$ and $\underline{m}$ can be calculated as:

$$d = \sqrt{(\underline{x}-\underline{m})\underline{\underline{C}}^{-1}(\underline{x}-\underline{m})^T}$$

The cumulative probability for distance R can be calculated by the integration of the probability within distance R of the hyper volume:

$$P_K(R) = \int_{d-R} N(\underline{m},\underline{\underline{C}}) dV$$

where the integration is over the K dimensional hyper volume. Equivalently, $$P_K(R) = A_K \int_0^R t^{K-1} \exp\left(-\frac{t^2}{2}\right) dt$$

where $A_K$ is a constant satisfying $$A_K \int_0^\infty t^{K-1} \exp\left(-\frac{t^2}{2}\right) dt = 1.$$

$$I_K(R) = \int_0^R t^K \exp\left(-\frac{t^2}{2}\right) dt$$

Then, the probability is $$P_K(R) = A_K I_{K-1}(R) = \frac{I_{K-1}(R)}{I_{K-1}(\infty)}$$

Using partial integration formula, we can get the following equation $$I_K(R) = \frac{I_{K+2}(R)}{K+1} + \frac{R^{K+1}}{K+1} \exp\left(-\frac{R^2}{2}\right)$$

Equivalently, $$I_K(R) = (K-1)I_{K-2}(R) - R^{K-1} \exp\left(-\frac{R^2}{2}\right)$$

The initial values of $I_K(R)$ are $$I_0(R) = \int_0^R \exp\left(-\frac{t^2}{2}\right) dt$$

and $$I_1(R) = \int_0^R t \exp\left(-\frac{t^2}{2}\right) dt = 1 - \exp\left(-\frac{R^2}{2}\right)$$

The value of $I_K(\infty)$ is different when K is even versus when K is an odd number.

For even (K=2q) case, $$\begin{aligned}
I_{2q}(\infty) &= (2q-1)I_{2q-2}(\infty) \\
&= (2q-1)(2q-3)\ldots 1 I_0(\infty) \\
&= \frac{(2q)(2q-1)(2q-2)(2q-3)\ldots 1}{(2q)(2q-2)(2q-4)(2q-6)\ldots 2} I_0(\infty)
\end{aligned}$$

Equivalently, $$I_{2q}(\infty) = \frac{(2q)!}{2^q q!} I_0(\infty)$$

For odd ($K=2q+1$) case, $$I_{2q+1}(\infty) = 2q\, I_{2q-1}(\infty) = (2q)(2q-2)\ldots 2\, I_1(\infty)$$

Equivalently, $$I_{2q+1}(\infty) = 2^q\, q!\, I_1(\infty)$$

where $$I_0(\infty) = \int_0^\infty \exp\left(-\frac{t^2}{2}\right) dt = \sqrt{\frac{\pi}{2}}$$

and $$I_1(\infty) = \int_0^\infty t\exp\left(-\frac{t^2}{2}\right) dt = 1$$

In summary, the matching score is calculated as one minus the cumulative probability as follows:

$$S_K(R) = 1 - P_K(R)$$

and the cumulative probability is $$P_K(R) = \frac{I_{K-1}(R)}{I_{K-1}(\infty)}$$

The recurrent formula is $$I_K(R) = (K-1)I_{K-2}(R) - R^{K-1}\exp\left(-\frac{R^2}{2}\right)$$

where the initial values are $$I_0(R) = \int_0^R \exp\left(-\frac{t^2}{2}\right) dt$$

and $$I_1(R) = 1 - \exp\left(-\frac{R^2}{2}\right)$$

The denominator of the probability is $$I_{2q}(\infty) = \frac{(2q)!}{2^q q!}\sqrt{\frac{\pi}{2}}$$

for $K = 2q$ and $$I_{2q+1}(\infty) = 2^q q! \text{ for } K = 2q+1$$

II.3 Partition Model Update

The partition model update method inputs a partition model and data for model update and perform partition model update to generate updated partition model output. There are two partition model update methods: a progressive update method and a regressive update method. The progressive update method adds new learning data into the partition model. The regressive update method removes existing learning data from the partition model.

II.3.1 Progressive Update

Figure 8:
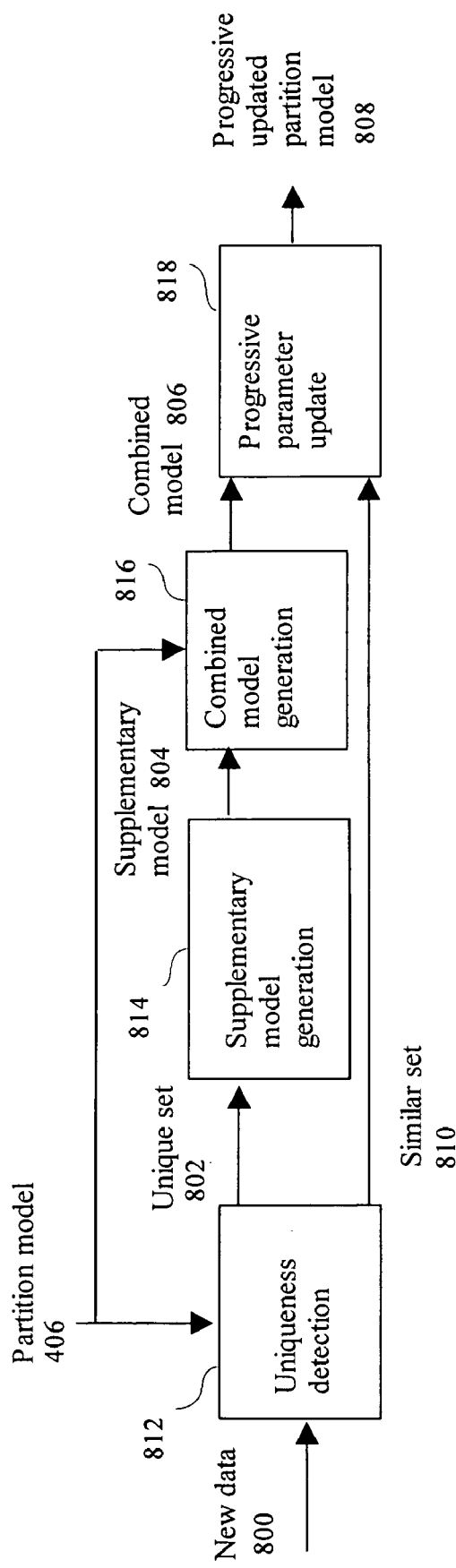
FIG. 8 shows the processing flow for the progressive update method.

The processing flow for the progressive update method is shown in FIG. 8. As shown in the figure, new data 800 and the input partition model 406 are processed by a uniqueness detection step 812. The uniqueness detection method 812 separates the data into a unique set 802 and a similar set 810. The unique set 802 contains data that are unique with respect to the input partition model 406. The similar set 810 contains data that are similar to the data represented by the input partition model 406. The unique set 802 is processed by a supplementary model generation step 814 to generate a supplementary model 804. Afterwards, the input partition model 406 and the supplementary model 804 are combined by a combined model generation step 816. This generates a combined model 806. The combined model 806 is subject to a parameter update step 818 using the data from the similar set 810. The parameter updated combined model is the resulting progressive updated partition model 808.

A. Uniqueness Detection

The uniqueness detection determines the similarity between the new data and the input partition model. In one embodiment of the invention, partitioned matching method is used for the uniqueness detection. The new data is matched to the partition model by the partitioned matching method. The data with high matching scores are included in the similar set and the remaining data are included in the unique set.

B. Supplementary Model Generation

The supplementary model can be generated using the unique set and the same hierarchical partitioning and model generation method and the same feature vectors as those for the input partition model. This generates a supplementary model that is compatible in structure to the partition model yet has unique partitions associated with data from the unique set.

C. Combined Model Generation

The supplementary model and the input partition model have compatible structure and the supplementary model contains new and unique partitions. Therefore, the combined model is generated by simply including partitions from both models in each hierarchical level except for the highest level. In the highest level, the data from both models are combined into one single partition.

D. Progressive Parameter Update

The progressive parameter update method uses the similar set to update the combined model. The progressive parameter update method first finds the best matched partitions for a data point. Afterwards, the parameters of the partitions that match the input data are updated.

Figure 9:
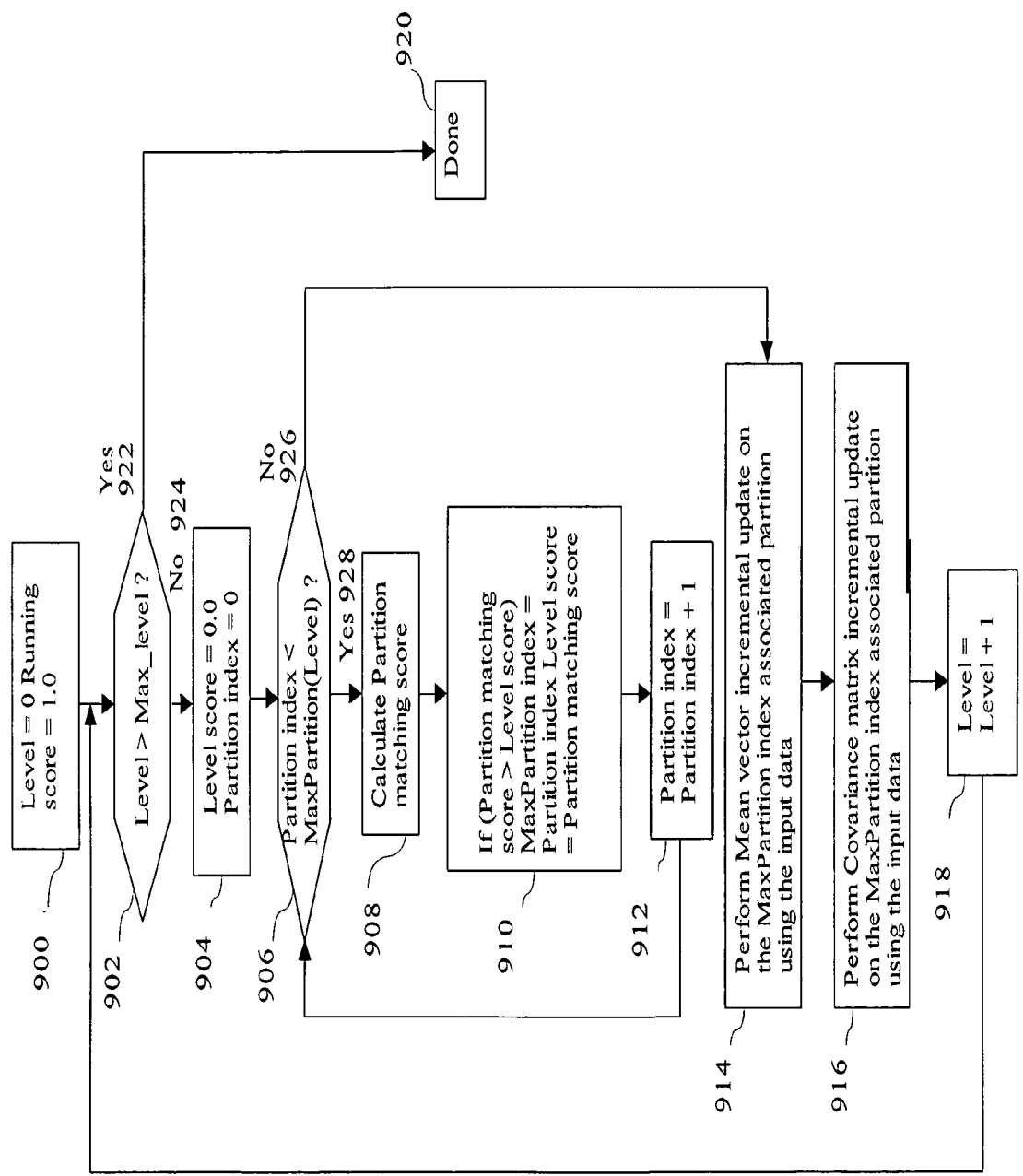
FIG. 9 shows the progressive parameter update processing flow for each of the input data points.

The progressive parameter update processing flow for each of the input data points is shown in FIG. 9. As shown in the flow chart, the portioned matching starts at the 0-th level 900 and a running score is initialized to 1.0 (900). At a given partition level, the level matching score is initialized to 0.0 (worst match) 904. After calculating partition matching score 928 of each partition at the same level, the level score is updated with the maximum partition matching score at the same level and the associated partition index is recorded 910. The partition index is incremented 912 and check 906 to see whether there are level partitions remained to be processed 926. If remaining partitions exist 928, the next partition is processed. After the completion of all partitions within a level 926, the mean vector and covariance matrix of the partition associated with the maximum matching score are updated using the input data 914, 916. The incremental update rules described in a previous section are directly applicable for the update.

The process continues to the next level 918, 902, 924. If no more levels exist 922, the update for a point is completed 920.

After all points in the similar set are processed by 565 the progressive parameter update step, the model update is completed. The incrementally updated combined model is the progressive updated partition model.

II.3.2 Regressive Update

Figure 10:
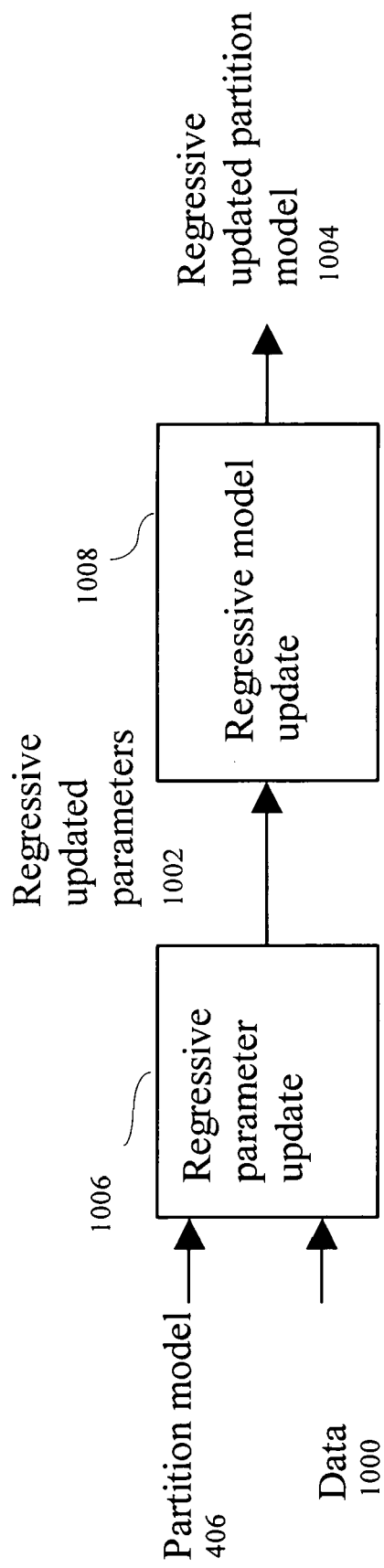
FIG. 10 shows the processing flow for the regressive update method.

The regressive update inputs a partition model and regression data. The regression data contains a subset of the previously learned data that the regressive update method intends to remove their effects. The processing flow for the regressive update method is shown in FIG. 10. As shown in the figure, the data 1000 and the partition model 406 are processed by a regressive parameter update step 1006 that identifies the associated partitions for each data 1000 and removes its effect. This results in the regressive updated parameters 1002.

The mean vector and covariance matrix regressive update rules can be easily derived. They are as follows:

A. Mean Vector Regressive Update Rule $$m[N-1] = \frac{1}{N-1}(N*m[N] - x_N)$$

B. Covariance Matrix Regressive Update Rule $$\underline{C}[N-1] = \frac{1}{N-1}(N*\underline{D}[N] - x_N x_N^T) - m[N-1]\underline{m}^T[N-1]$$

After the regressive parameter update 1006, the hierarchical model is checked from the lowest level up by a regressive model update step 1008. If a partition represents a much smaller number of points than others at the same level, it is merged into a partition within the same level that is most similar to the partition of interest. This results in the regressive updated partition model 1004.

III. Directed Pattern Enhancement

The directed pattern enhancement method of this invention consists of a pattern enhancement learning step and a pattern enhancement application step as shown in FIG. 1.

III.1 Pattern Enhancement Learning

The pattern enhancement learning inputs a learning image and pattern enhancement directive. The pattern enhancement directive contains one or multiple regions. Each of the regions could be labeled as "Patterns to enhance", "Patterns to suppress", or "Background". Background contains points to be excluded from pattern recognition. When "Background" region is specified, it is also used to extract the foreground patterns for the "Patterns to enhance" and "Patterns to suppress" regions. Only the foreground patterns are used for enhancement or suppression pattern learning.

Figure 11:
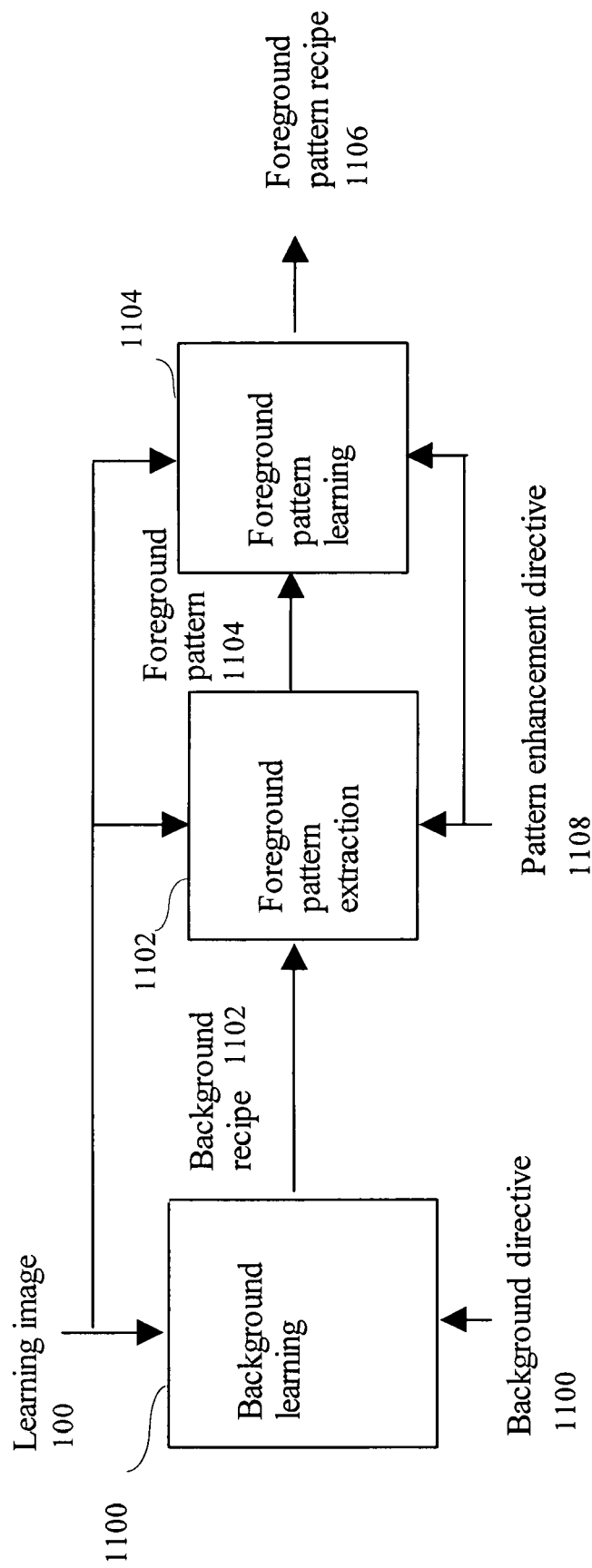
FIG. 11 shows the processing flow for the pattern enhancement learning method.

The processing flow for the pattern enhancement learning is shown in FIG. 11. As shown in the figure, the background directive 1100 and the learning image 100 are used to perform background learning 1100. This results in a background recipe 1102. The background recipe 1102, the learning image 100 and the pattern enhancement directive 1108 are used for foreground pattern extraction 1102. The extracted foreground pattern 1104 along with the learning image 100 and pattern enhancement directive 1108 are used for foreground pattern learning 1104 to generate foreground-pattern recipe 1106.

III.1.1 Background Learning

Background can be specified by a single or a plurality of regions from the learning image. In one embodiment of the invention, the partitioned modeling method is used for the background learning. Background tends to contain homogeneous patterns within its region. So a set of background characterization features such as grayscale or color intensity, contrast, texture, etc. can be per-defined for popular applications. The background recipe of the background learning result should contain the partition model specifically learned for the background.

III.1.2 Foreground Pattern Extraction

After background recipe is generated. Its partition model is applied to the regions in "Patterns to enhance" and/or "Patterns to suppress" for partitioned matching. The points within the pattern regions having good background matching scores are excluded from the pattern. The points within the pattern regions whose background matching score are low are the foreground pattern points that will be used for foreground pattern learning.

III.1.3 Foreground Pattern Learning

The foreground patterns in the regions in "Patterns to enhance" or "Patterns to suppress" are used for foreground pattern learning. When both the "Patterns to enhance" or "Patterns to suppress" are specified, they will be considered together for feature selection. But the foreground pattern learning is applied separately for the "Patterns to enhance" and "Patterns to suppress".

The feature selection step extracts a wide range of features from the foreground patterns in "Patterns to enhance" and "Patterns to suppress". The features are selected based on the discrimination power between "Patterns to enhance" and "Patterns to suppress". The features could be ranked based on discrimination such as stepwise discrimination method.

In one embodiment of the invention, the partitioned modeling method is used for the foreground pattern (either enhancement or suppression) learning. The foreground recipe of the foreground pattern learning result should contain the partition model specifically learned for the foreground patterns.

III.2 Pattern Enhancement Application

Figure 12:
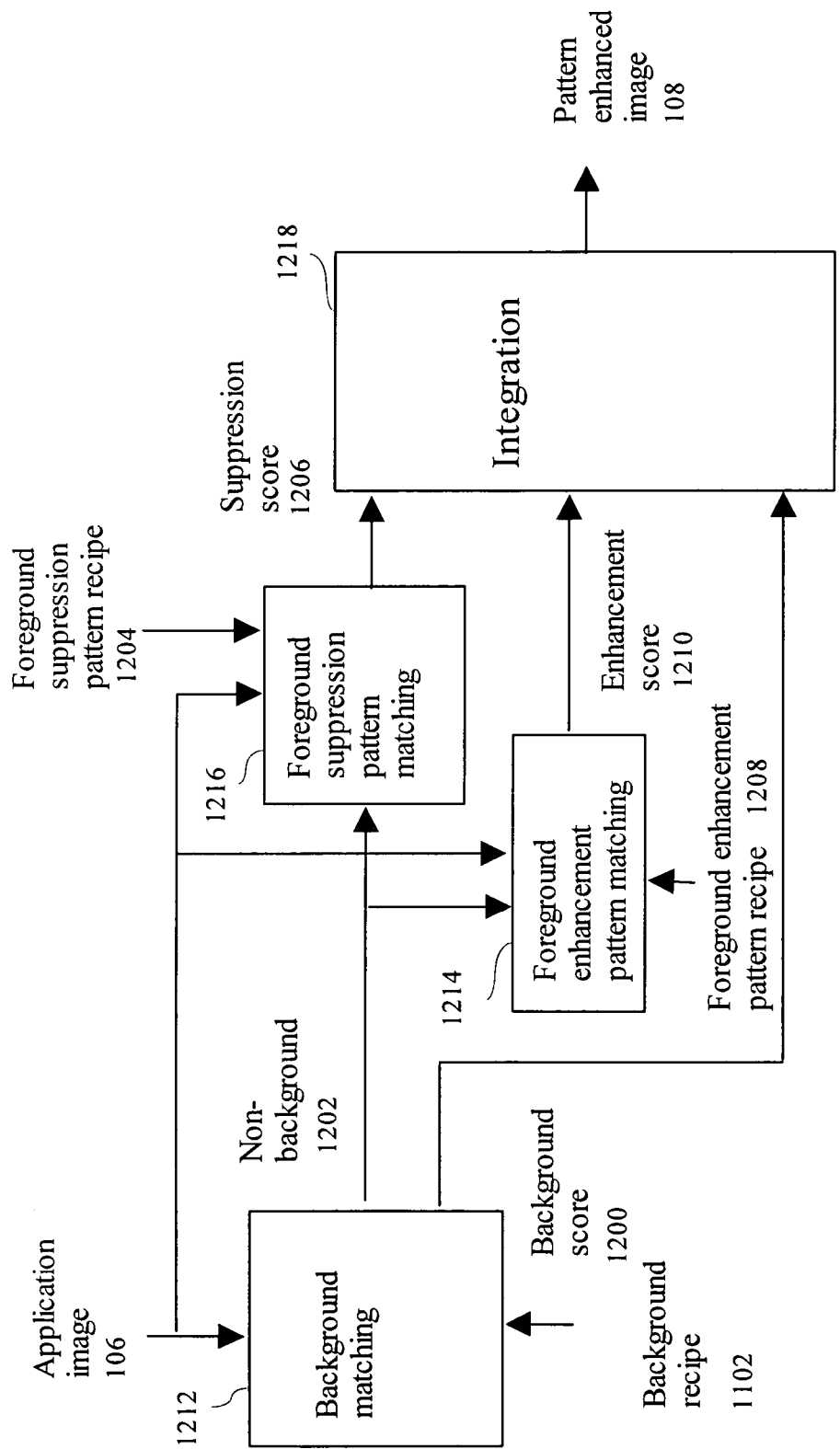
FIG. 12 shows the processing flow for the pattern enhancement application method.

The processing flow for the pattern enhancement application is shown in FIG. 12. It inputs an application image 106 and/or pattern enhancement recipe including background recipe 1102, foreground enhancement pattern recipe 1208 and/or foreground suppression pattern recipe 1204. The pattern enhancement recipe could include at least one of the pattern types: background, foreground enhancement pattern, and foreground suppression pattern. When background recipe 1102 is specified, the background matching 1212 is first applied. It is performed by the partitioned matching method using the background partition model. The partitioned matching scores a subset of the image points as background with their background scores 1200. The remaining points are considered non-background 1202. The non-background points 1202 are processed by either or both of the foreground enhancement pattern matching 1214 and foreground suppression pattern matching 1216. The foreground pattern matching 1214, 1216 (either enhancement or suppression) use the partitioned matching method based on the foreground partition model contained in the foreground pattern recipe 1208, 1204. This results in either or both of the suppression score 1206 and the enhancement score 1210. The background score 1200, the suppression score 1206 and the enhancement score 1210 are integrated by an integration step 1218 that generates the pattern enhanced image 108.

The integration step 1218 combines the three scores. We assume scores are between 0 and 1. The method is equally applicable to other conventions and ranges of scores. In one embodiment of the invention, the background score takes the precedence over the other two scores. When a point is determined to be a background point, its final pattern score is Pattern_score=1.0−Background score When a point is a non-background, its pattern score can be calculated as

[(α*enhancement score−(1−α)suppression score)+ 1.0]/2

In alternative embodiments, the final pattern score could be calculated by

[(α*enhancement score+(1−α)*(1.0−suppression score)

or enhancement score/(enhancement score+suppression score)

When background recipe does not exist, all points are considered non-background. When foreground enhancement pattern recipe does not exist, the enhancement score for all points are considered 1. When foreground suppression pattern recipe does not exist, the enhancement score for all points are considered 1.

A special integration method could be applied when both the enhancement score and suppression score have high values. In one embodiment of the invention, the average enhancement score and average suppression score of the neighbors of the points are used instead of the original score for the special integration. In another embodiment of the invention, other matching method using whole neighbor as template is used to create a new enhancement score and a new suppression score for the special integration.

III. Pattern Enhancement Update Learning

The pattern enhancement update learning allows the update of the pattern enhancement recipe either through progressive update learning (see FIG. 2) or regressive update learning (see FIG. 3). In one embodiment of the invention, the background recipe, the foreground enhancement pattern recipe and the foreground suppression pattern recipe are updated independently. The update could be performed using the partition model progressive update and regressive update methods.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A directed pattern enhancement method comprising the steps of:
   a) Input learning image and pattern enhancement directive;
   b) Perform pattern enhancement learning using the learning image and the pattern enhancement directive having pattern enhancement recipe output;
   c) Input application image;
   d) Perform pattern enhancement application using the application image and the pattern enhancement recipe having pattern enhanced image output wherein the pattern enhancement application comprising the steps of:
      a) Perform background matching using the background recipe and the application image having non-background or background score output:
      b) Perform foreground enhancement pattern matching using foreground enhancement pattern recipe and the application image having enhancement score output;
      c) Perform integration using the enhancement score and the background score having pattern enhanced image output;
      d) Perform foreground suppression pattern matching using foreground suppression pattern recipe and the application image having suppression score output;
      e) Perform integration using the enhancement score, the suppression score and the background score having pattern enhanced image output wherein the integration step further comprising a special integration step when both the enhancement score and suppression score have high values.

2. The special integration step of claim 1 uses the average enhancement score and average suppression score of the neighbors of the points.

3. The special integration step of claim 1 uses whole neighbor as template to create a new enhancement score and a new suppression score.

* * * * *